March 19, 1929.  J. R. McK. TISDALE  1,706,047
RECORDER
Filed Jan. 7, 1928  4 Sheets-Sheet 1

JAMES R. McK. TISDALE
INVENTOR

ATTORNY

March 19, 1929. J. R. McK. TISDALE 1,706,047
RECORDER
Filed Jan. 7, 1928 4 Sheets-Sheet 2

JAMES R. McK. TISDALE
INVENTOR
BY
ATTORNEY

March 19, 1929.  J. R. McK. TISDALE  1,706,047
RECORDER
Filed Jan. 7, 1928    4 Sheets-Sheet 3
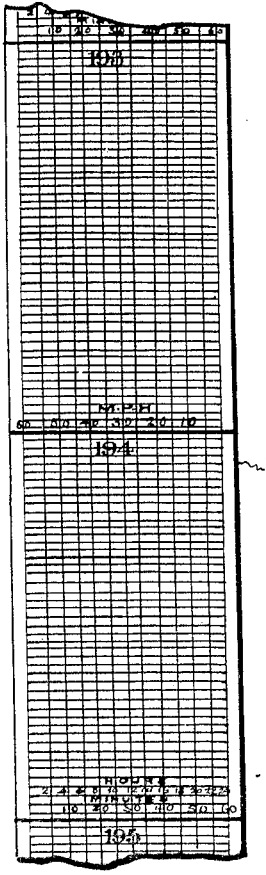
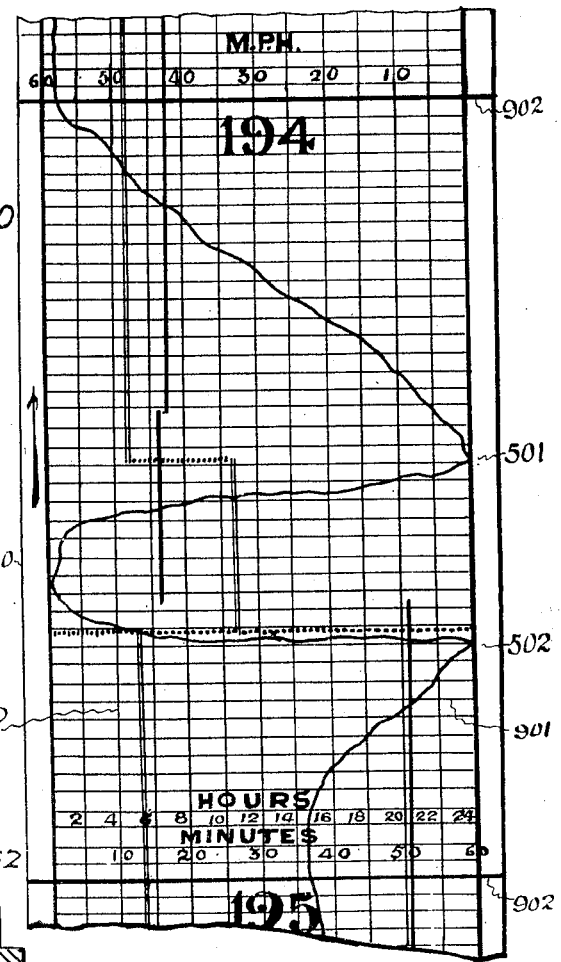
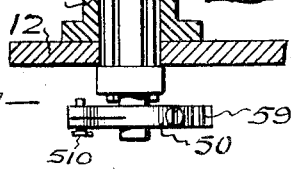
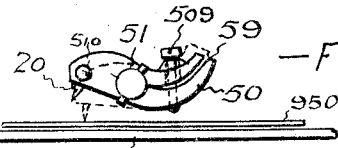
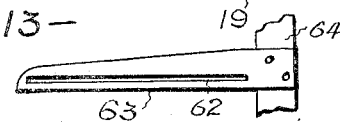
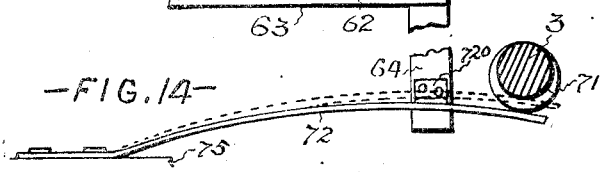
JAMES R. McK. TISDALE
INVENTOR
BY
ATTORNEY March 19, 1929.  J. R. McK. TISDALE  1,706,047
RECORDER
Filed Jan. 7, 1928   4 Sheets-Sheet 4
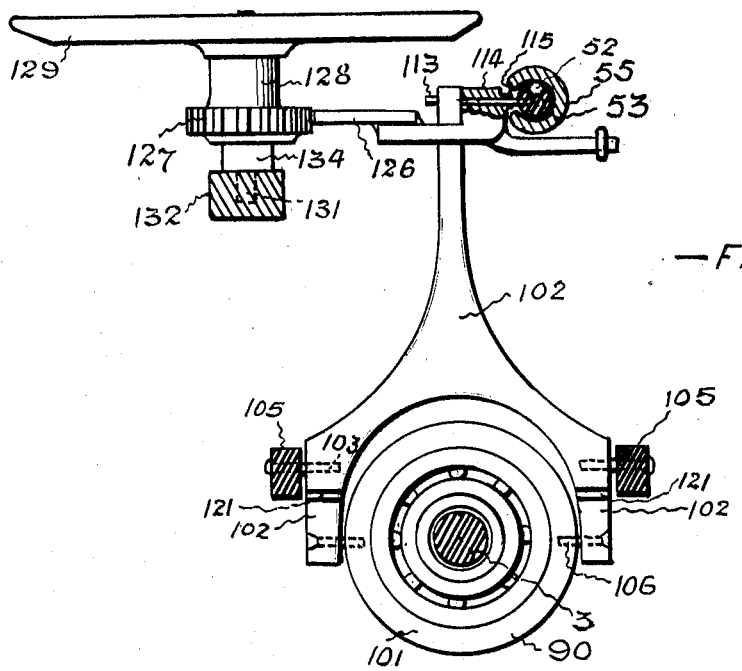
—FIG.6—
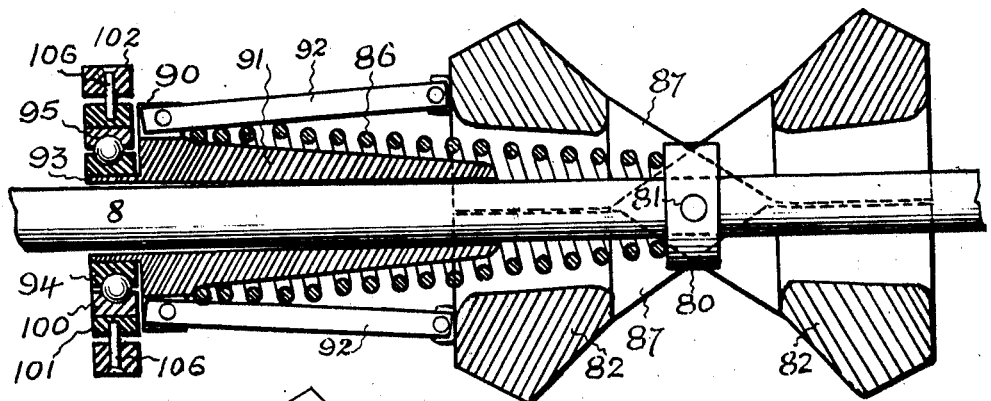
—FIG.7—
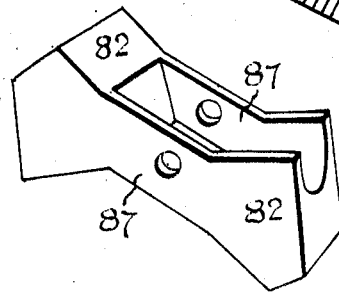
—FIG.8—
JAMES R. McK. TISDALE
INVENTOR
BY
ATTORNEY Patented Mar. 19, 1929.

1,706,047

UNITED STATES PATENT OFFICE.

JAMES RUSSELL McKENZIE TISDALE, OF VANCOUVER, BRITISH COLUMBIA, CANADA.

RECORDER.

Application filed January 7, 1928. Serial No. 245,244.

My invention relates to recorders for recording the speed and varying degrees of operation of a machine and the time consumed during periods of operation and periods of rest.

The object of my invention is to obtain an accurate permanent record of any use to which a machine of this nature may be put, including the duration of its operation, interruptions, the duration of the stoppages, and any reversals of the machine and their duration, together with the running speed and time or times of rest.

Broadly stated the invention consists of a recorder with connection to the driving gear of the machine; and in the embodiment illustrated and presently described the invention is shown applied to a recorder for motor cars for hire or busses to be run on a time schedule. The recording mechanism is contained in a case in one side of which is exposed a clock for timing the movements or operations of the machine and the speed and distance indicating mechanism. The car is divided into three compartments. One of these compartments contains power transmission and governing mechanism through which latter the varying speed of the driving power of the machine is controlled to contribute to the coordination of the driven mechanisms in the second compartment. The third compartment contains a stylus which is caused by the transmission mechanism to traverse a ribbon also contained in the second compartment. This ribbon bears thereon printed representations of divisions of distance and of time. In this second compartment there are also feed and take up rolls for the ribbon, a train of gears for operating them and a table on which the moving ribbon rests. There is an operative connection between the transmission gear in the first compartment and the train of gears, whereby the travelling ribbon is synchronized with the movement of the stylus. In a third compartment an ordinary high grade clock movement is located and it has operatively connected to its minute and hour-hand operating gears respectively a pair of markers one of which is adapted to make a mark each minute on the ribbon and the other a mark each hour.

With this recording mechanism, as just broadly stated, I obtain an accurate permanent record of the time the machine is started on a given trip, the number of times it stops during the trip, and the duration of the respective stops. At the same time the speed the machine travelled between stops is recorded as well as the extent of the operation of the machine.

My invention is adapted for use in connection with the operation of motor cars and busses, although it may be applied to any other man-operated machine, and, as applied to a motor car or bus the recorder consists of a ribbon with means for causing it to travel and a stylus in inscribing relation with the ribbon. A time indicating device is mounted in inscribing relation with the ribbon, the stylus is in operative connection with a driving member of the car or bus through transmitting means including a governor so constructed and arranged to have the operation of the stylus synchronized with the ribbon feed and the time inscribing device. With the operating elements of the recorder constructed and arranged as thus broadly stated an accurate permanent record of the movements of the car or bus may be obtained.

For full comprehension, however, of my invention, reference must be had to the accompanying drawings, in which similar reference characters indicate the same parts, and wherein:

Figure 6 is a detail axial sectional view of the means through which the governor actuates the stylus and speedometer dial;

Figure 7 is a detail sectional view of the governor and illustrating particularly the expansile and contractile construction thereof and connection between the governor and the stylus operating lever;

Figure 8 is a detail perspective view of one of the members of the governor, detached;

Figure 9 illustrates in detail a section of the ribbon;

Figure 10 illustrates a section of the ribbon drawn to an enlarged scale;

Figure 11 is a top view of the stylus head and the connection between it and the slide rod, oscillatory rod and guiding sleeve, the sleeve being shown in horizontal section;

Figure 12 is an enlarged elevation of the stylus and its carrying head with relation to the ribbon and table, and illustrating its vibration in dotted lines;

Figure 13 is a side elevation of the guide plate for the horizontal movement of the oscillatory rod; and Figure 14 is a side elevation of the means for vertically vibrating the guide plate.

Figure 1:
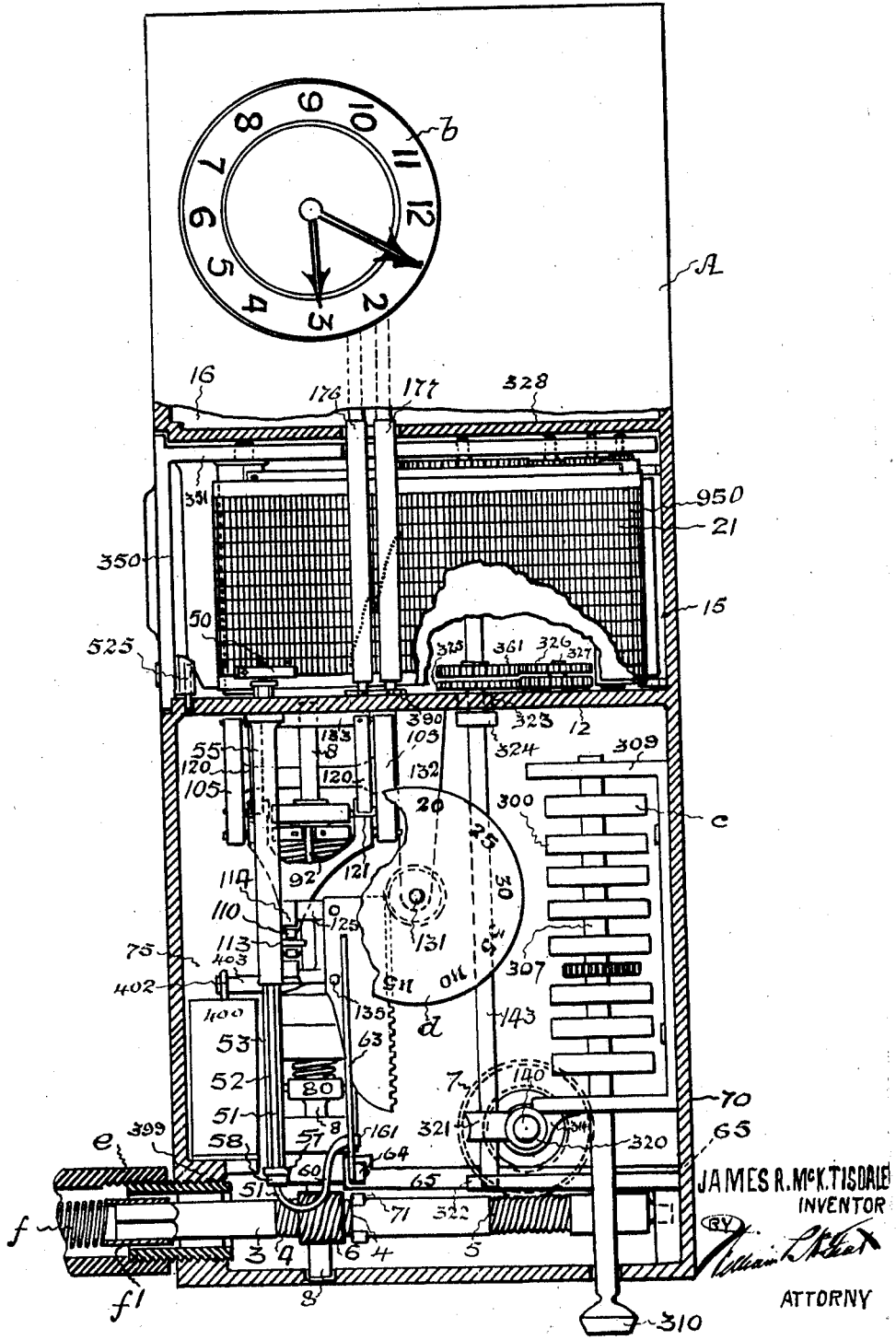
Figure 1 is an elevation of the face of my improved recorder with the cover of the recording and power transmission departments removed.

The case containing my improved recording mechanism is indicated at A. The case is divided into three compartments the first containing power transmission and governing mechanism; the second the driven recording mechanism and the third the clock with an operative connection between it and the time recording mechanism. The first compartment is separated from the second compartment by a partition 12 and this compartment is separated from the clock compartment by a partition 328. The space 15 between partitions 12 and 328 accommodates a drawer in which is mounted the recording ribbon and this space has extending into it from the transmission compartment, the governed stylus moving proportionately with and under control of the driving gear of the car or bus, or in fact any other machine whose operation it may be desired to record. In order to facilitate the marking of the ribbon by the stylus without tearing the ribbon the transmission includes means for vibrating the stylus to and from hard contact with the ribbon. The effect is the same as when a person is drawing a dotted or chain line with a stylus or pencil. The recorder so operates that it alternately makes a mark and is lifted from the ribbon, this being continued intermittently. The visible clock face is indicated at $b$, the distance counting discs at $c$ and a speedometer dial at $d$. The recorder is operated from the traction power of the car through a flexible shaft consisting of a flexible tube $e$ containing a comparatively rigid torque transmitting spring $f$ having at one end, not shown, a coupling for connection to the driving gear of the car or bus and at its opposite end a coupling $f'$ for connection to one end of a shaft 3 serving as the initial member of the transmission mechanism.

The power is transmitted from this shaft 3 through worms 4 and 5 formed integrally with the shaft, the worm 4 having a driving worm 6 intermeshing therewith, and a worm wheel 7 intermeshing with the worm 5. The worm 6 is mounted rigidly on a horizontal counter-shaft 8 which bears at one end in the end wall 10 of the case. The opposite end of this shaft 8 bears in the partition 12. It is from this shaft 8 that the movement of the stylus across the ribbon, proportionately with the speed of operation of the driving gear of the car, or in other words the rotation of the traction wheels, that the record of the movements is graphically inscribed on the ribbon. This recording by the stylus is done as a permanent record on a ribbon of paper having a metallic coated surface and sub-divided both longitudinally and transversely, as will be presently described in connection with the operation of the recorder. This ribbon is illustrated at 21 (see Figures 9 and 10). The stylus is indicated at 20 and preferably consists of brass and it is made to intermittently mark on the ribbon short lines in continuous unbroken series. The ribbon is in a roll 22 from which it is drawn by a take up roll over a metal table 19 (Figure 12) composed preferably of a sheet of steel, to be presently further alluded to. The stylus 20 is caused to make its marks across the ribbon from one side to the other proportionately as the speed of the car is increased and to return to the side from which it started as the speed of the car is diminished. This function is performed through shaft 8 and the worms 6 and 4 by the initial transmission shaft 3. Shaft 8 has a collar 80 rigidly mounted on it which a governor straddles and its arms are pivotally connected to the collar by pivot pins 81 (Figure 7). The governor consists of a pair of interdigitating frames. One of the frames is composed of a pair of flat plate-like members 87 with a pair of relatively heavy heads 82 at its opposite ends and the other frame is composed of similar flat plate-like members having a pair of relatively heavy heads at its opposite ends. The frame members thus formed fit together with the plate-like sides of one within the plate-like sides of the other and these plate-like sides are pivoted on the pivot pins 81. This particular arrangement of the governor arms causes them to lie with their heads together enclosing shaft 8 while the driving gear is at rest and to separate by the centrifugal force developed during rotation, being thus given a tendency to contract as is usual with all governors of this type. This governor is shown in detail in Figure 7. The normal position of the arms is yieldingly maintained by a conical spring 86 encircling and supported by a conical core 91. One end of this conical spring bears against collar 80 and the opposite end against a flange 90 forming the base of the conical core with which it is integrally formed, as shown in Figure 7. The conical core has an integrally axially projecting hub 93 and the core with its hub is rotatably and slidably mounted on shaft 8. The hub has securely mounted thereon the inner part 94 of a ball-race 95 the outer part of which is a ring 100 fastened within an encircling ring 101. The inner member 94 of the ball-race moves with the hub 93 during the rotation of the governor, but this rotation is not transmitted to the member 100 although the ball-race acts as a thrust connection and causes the member 101 to move with the core axially with regard to the shaft 8. The axial movement of the ring 101 with the governor arms is transmitted to the stylus through a forked lever the arms 102 of which are pivotally connected as at 106 to the ring 101 which as just mentioned does not rotate but accommodates the ball-race rotatably within it. The lever 102 has its arms, straddling and fulcrumed as at 103 on a frame 105 carried pivotally on partition 12. The motion of the ring 101 with the governor, axially with regard to shaft 8, is transmitted to the stylus through the lever 102 the upper end of which is forked as at 110 which pivotally engages a pin 113 carried by a slidable block 114 over a slot 115 in the side of rigid sleeve 55 fixed to the partition 12. A slide-rod 53 is carried in this rigid sleeve 55 and contains slidably in a groove 52 therein an oscillatory rod 51, preferably of piano wire (Figures 11 and 12). The oscillatory rod 51 carries a head 50 rigidly thereon and consisting of a metal block clamped to the end of rod 51 between jaws formed by a split portion 59 and a clamping screw 509 at one end of the head, the opposite end whereof has the stylus clamped therein by a clamping screw 510 (see Figs. 11 and 12). A collar 54 is mounted on the end of the side rod close to the opposite side of partition 12, while a collar 57 on the opposite end of this slide rod 53 retains the oscillatory rod 51 within its groove and a collar 58 prevents radial displacement thereof with regard to the slide rod with which it moves. The collars 54 and 57 are rigidly mounted on the slide rod 53 the collar 58 being fixed on the oscillatory rod 51 to prevent it from lengthwise movement in the rod 53 while permitting it to oscillate in the slide rod for the purpose of vibrating the stylus carrier. The block 114 is held slidably to the fixed sleeve 55 through the slot therein by the pin 113 (Figure 6) which is rigidly mounted in the block and slidable in sleeve. The opposite end of the oscillatory rod 52 is bent in the form of a goose neck 60 the end of which is flattened as at 161 and protrudes through and is slidable in a slot 62 in a guide arm 63. The guide arm is carried on the upper end of a vertically reciprocal narrow flat bar 64 guided in its vertical reciprocation in a bracket 65 fastened to the end 70 of the case (indicated partly dotted in Figure 1). The bar 64 is reciprocated, and through the goose-neck end and the rod 51 the stylus carrying head 50 is vibrated and the stylus intermittently alternately raised free from and lowered into positive contact with the surface of the ribbon on which it makes a short line because of the feeding forward or backward of the ribbon. This bar 64 and with it the stylus is lowered by an eccentric 71 mounted on the transmission shaft 3. The eccentric acts on one end of a flat spring 72 (Fig. 14) fastened at one end to the side 75 of the case, the bar 64 being secured at its lower end as at 720 to the spring. This particular arrangement of parts secures the lowering or depression of the spring and with it the bar 64, which spring is released by the eccentric and springs up and raises the end of the goose neck 60, thus oscillating the rod 52 and the stylus carrying head 50. In this manner the stylus is intermittently raised and lowered as above mentioned and the stylus is also moved to and fro across the ribbon by the contracting and expanding of the governor as the speed of the car is increased and decreased. To summarize this operation of the stylus: The initial transmission shaft 3, rotated from the flexible shaft $f$ by the driving gear (not shown) is transmitted through worms 4 and 6 to the shaft 8 and through it to the governor from which the motion passes through links 92 to the core 91 thus causing the core and spring to rotate with the shaft and governor. Simultaneously as the governor opens under the centrifugal force developed, the lever 102 is turned on its fulcrum and the slide rod 53 with the oscillatory rod 52 and the stylus is made to traverse the ribbon transversely and graphically indicate its path thereon.

Figure 2:
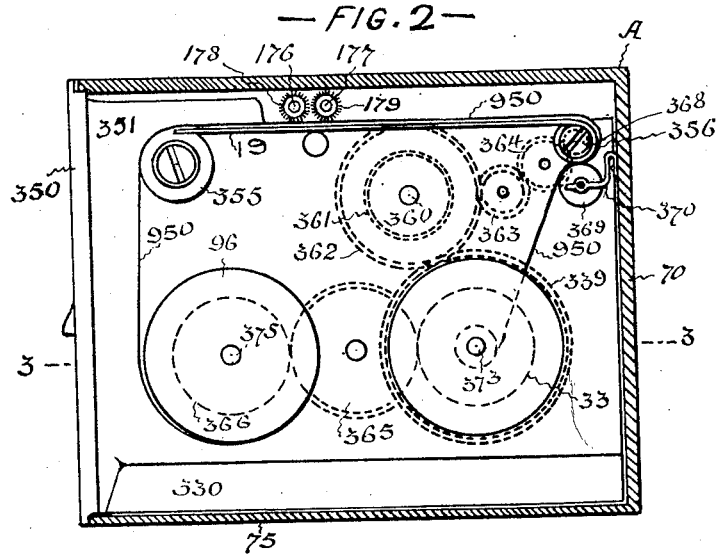
Figure 2 is a transverse vertical sectional view taken on line 2—2 Figure 1.
Figure 3:
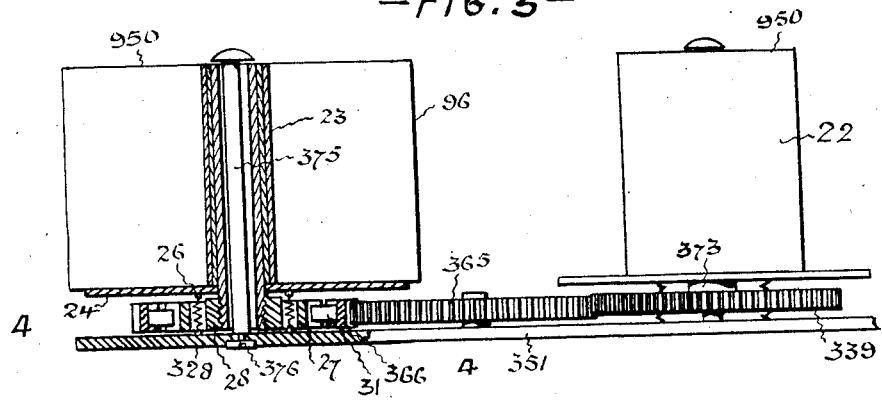
Figure 3 is a detail part axial sectional view and part elevation of the recorder and ribbon roll carriers, the sectional view of the recorder being taken on line 3—3 Fig. 2, and the sectional view of the ribbon roll carrier being on line 3—3 Fig. 4.
Figure 4:
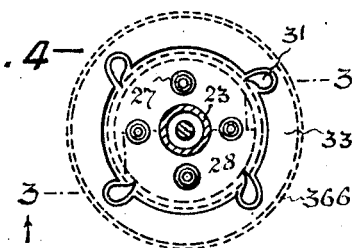
Figure 4 is a detail sectional view at right angles to the illustration in Figure 8 and taken on line 4—4 Figure 3.
Figure 5:
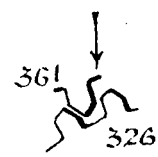
Figure 5 is a detail view illustrating the particular form of the teeth of the gears through which operative connection may be readily effected between the mechanism for driving the recording ribbon roll and the end gear of the transmission mechanism.

In order to eliminate lost motion between the lever 102 and the block 114 and consequently the slide rod 53 and the stylus, a pair of bow springs 120 are secured at one end to an attachment block 133 to which block a frame 105 is pivoted. The springs 120 are fastened to the top of this block and their ends engage in slots 121 in the lever 102 (see Figures 1 and 6) thus yieldingly retaining the lever and its coacting parts in operative relation. A speed indicating dial 129 is rotatably carried on a pin 131 set in the end of a rigid arm 132 secured to the partition 12 of the case. The dial is integrally connected to a sleeve 128 carrying rigidly on the lower end thereof a pinion 127. A distance block 134 lifts the sleeve and pinion clear of the arm 132. The dial is rotated by a rack 126 secured as at 135 to arms 125 projecting laterally from the block 114. This affords an operative connection between the stylus operating mechanism and the dial because the rack 126 being fastened to the block 114 moves to and fro with it and as the rack intermeshes with the pinion 127 the dial is rotated to the right or to the left in unison with the traversing movement of the stylus across the ribbon and according to the rise and fall in the speed of the car the number on the dial indicating the speed which may be exposed through a window in the case. The relative diameter of the pinion 127 and the radius of the arm 102 is so proportioned that the rotation of a given point on the dial will correspond with a given point in the path graphically presented on the ribbon by the stylus. The usual counting discs, may expose their numbers through a suitable pair of windows in the case. They are indicated at 300 and are mounted as usual on a shaft 307 in a bracket 309 fastened to the side plate 70 of the case, as shown in Figure 1. The shaft as usual has a button 310 by which the discs may be rotated and relatively shifted as may be required. This shaft and a shaft 143 for transmitting motion to the recording mechanism are operated from the worm 5 on the initial transmission shaft 3 through the worm wheel 7. This worm wheel is mounted rigidly near the lower end of a vertical shaft 140 having its lower end set in a bearing (not shown) fastened to the side 75 of the case while the upper end of this vertical shaft 140 is journalled in bearing 314 fastened to one end of the bracket 309. The vertical shaft has mounted thereon a worm 320 intermeshing with a worm 321 on shaft 143. This shaft 143 is journalled at one end in a bracket 322 and at its opposite end extends through a bushing 323 set in the partition 12, the shaft 143 carrying rigidly thereon a collar 324 preventing longitudinal displacement thereof while leaving it free to rotate. The protruding end of the shaft carries a spur gear 325 intermeshing with one of a pair of idlers 326 also mounted as at 327 on the partition 12. The worm 320 on the vertical shaft 140 is also in operative communication with the counting discs through gear not shown, being of well known and ordinary construction for the purpose. The idler 326 transmits motion to the ribbon by the following means:

A drawer is located in the compartment 15 of the case which extends from partition 12 to a partition 328, the latter forming one wall of a clock compartment 16. This compartment 15 extends from the front wall to the back wall 70 of the case. The drawer has a front plate 350 and a carrying side plate 351 on which is mounted the table 19 supporting the ribbon moving over it for receiving the graphically presented record. All the ribbon operating mechanism is also mounted on this side plate 351 and it is formed integrally with the front plate and has a flat plate-like foot 330 with a downwardly extending flange which with the bottom edge of the side plate slides along the bottom side 75 of the case as the drawer is inserted and withdrawn. This drawer is shown in side elevation in Figure 2 and top elevation in Figure 1, the top of the case being partially removed. A fixed cylindrical bar 355 near the front of the drawer is carried rigidly on the side plate. A cylindrical shaft 356 is rotatably mounted on the carrying plate with its upper surface on the same level as the top of bar 355. The table 19 is carried by the tubular bar 355 which is checked along its top surface to receive one end where it is rigidly connected, the opposite end resting freely on the roll 356. A shaft 360 is rotatably mounted at one end in the carrying plate and its opposite end carries a spur gear 361 to engage the idler 326 when the drawer is pushed into place. This shaft carries a spur gear 362 which intermeshes with an idler 363 which in turn intermeshes with another idler 364 which intermeshes with a spur gear 368 mounted on the end of the shaft 356. This train of gears drives the shaft 356, which is caused to function as a feed roller by the friction of a rubber roller 369 mounted in a spring bracket 370 carried by a wall 70 of the case. The gear 362 intermeshes with a gear 339 mounted on a hollow shaft 373 by which it is adapted, when the car or bus is moving forward, to act as a take up roller. A gear 365 transmits rotation from the shaft 373 through a spur gear 33 to a gear 366 on a shaft 95 carrying a roll 96 of ribbon. The connection between the shaft 373 and the carrying plate 351 is by means of a screw 375 rigidly secured to the carrying plate by a nut 376 clamping the plate between it and a shoulder on the screw as shown in Figure 3. A sleeve 23 having a ribbon roll supporting disc 24 secured rigidly thereon is rotatably mounted on the screw and with the disc is free to rotate. Beneath the disc and on its sleeve is rigidly secured a ratchet wheel 28 having holes 27 accommodating expansile coiled springs 26 which bear between the carrying plate 351 and the disc for the purpose of yieldingly resisting the rotation of the disc and through it the roll of paper 96 mounted thereon termed a ribbon. This ratchet wheel is engaged by a series of pawls 31 carried in an encircling ring having the gear toothed circumference thus forming a spur gear 366 adapted to rotate the sleeve 23 in one direction only which is the direction necessary to cause the roll to perform the function of a take up when the car is backing up. The operative connection between the driving gear and the ribbon rolls 22 and 96 is by this ratchet and pawl mechanism but this mechanism is reversed as to its operation to accommodate the forward and backward movement of the car. The arrangement of the ratchet 28 and pawls 27 as shown in Figure 4 causes the gear 336 to rotate the roller in a take-up direction and act as a take-up when the car is backing up; while similar mechanism connects the gear 33 to the gear 336 but is reversed in that the ratchet teeth and pawls are oppositely arranged and act as a take-up when the car is moving forwardly. The particular advantage of this arrangement of these parts is that as the car or bus moves forward the roll of paper 22 takes up the length of ribbon as it is fed by feed roll 356, and owing to the operation of the train of gears and ratchet 28 the roller 96 releases the ribbon under the tension of the springs 26. As the car or bus backs up the reverse action takes place and the pawls engage the ratchet wheel of shaft 23 and cause it to act as a feed roll in reverse and the pawls of roll 22 release the ratchet and cause it to release the ribbon roll under the tension of the springs 26 of that roll. It will be observed, reference being had to Figure 2, that the ribbon moves from roll 355 over the table 19 by the action of the feed roll 356 and is taken up by roll 22. It may also be observed that by a reversal of operation of this train of gears and ratchets the ribbon will be pulled by the roll 96 back over the table and assisted by the reversely acting shaft 356 will be taken from the roll 22. The train of operating spur gears should be proportioned to the speed of the initial transmission shaft 3 and time recording mechanism.

The time recording mechanism includes a pair of rollers 176 and 177, the roller 176 being adapted to make one complete revolution each twenty-four hours and the roller 177 one revolution each hour. These rollers are therefore operatively connected to the hour hand mechanism and minute hand mechanism respectively in the clock indicated at b. The roller 176 has a spiral series of pins 178 so spaced that twenty-four marks across the ribbon will be made by the pins while sixty marks across the ribbon will be made by the series 179. The recording is effected by each pin as it makes contact with the ribbon during the rotation of its roller. These rollers are mounted at one end in the clock gear in any preferred manner to effect operative connection with the minute and hour hand operating mechanism and the opposite ends of these rollers are mounted in a bearing 390 on partition 12. This timing mechanism is synchronized with the operation of the ribbon feeding mechanism and the governing mechanism controlling movement of the stylus to and fro across the ribbon. The ribbon is illustrated in detail in Figures 9 and 10. It is marked by longitudinal lines 900 in twelve columns representing divisions of time of two hours each indicated by the numbers 2 to 24 from left to right and by transverse lines 902 into a continuous series of longitudinal panels each representing one mile of travel by the car or bus; the panels are sub-divided into fifty spaces by transverse lines 901. The panels are numbered from one to two hundred where it is desired to have a record for two hundred miles, and the longitudinal subdivisions marked M. P. H. represent five miles each per hour, each alternate line being numbered from 10 to 60. The alternate panels throughout the full length of the ribbon are thus marked. In the next preceding and following alternating panels each longitudinal line is marked in hours from two to twenty-four, representing twenty-four hours, above the word "Minutes" and below the word "Minutes" each alternate longitudinal line is marked in minutes 10, 20, 30, 40, 50 and 60 representing one hour. This is illustrated particularly in Figure 10.

A dash pot 400 is mounted on the coupling 399 for the flexible shaft e and extends parallel to the slide rod 52. Its piston is connected by a wire link 402 to an arm 403 rigidly carried by the block 114 to cause the dash pot to be operated in unison with and as a retarder for the governor under certain conditions. The object of this dash pot is to absorb the back lash due to the impetus of suddenly starting the car and thereby producing a sudden tension in the coiled spring f of the flexible shaft which would disturb the even operation of the recorder. The dash pot eliminates this disturbance. The drawer 351 may be locked as at 525.

*Operation.*

The clock as usual runs continuously, and the time marking rollers mark on the ribbon a record of the length of time the car or bus is stationary before it is started on a trip. When the car or bus is started the ribbon is immediately set in motion and the stylus simultaneously starts to inscribe its path across the ribbon in conformity with the speed of the car as translated by the operation of the governor. At the same time the speed indicating dial and counting discs are rotated. All of these operations excepting the time record are derived from the transmission shaft. The inscribed record would be without meaning if the ribbon were not printed with the longitudinal and transverse divisions and subdivisions described and shown in Figure 10. The ribbon moves in the direction indicated by the arrows thereon in Figures 1 and 10. The length of the panel divisions must each correspond with the distance the ribbon is fed while the car travels one mile. During this mile of travel, the variations in speed of the car are transmitted by the governor to the stylus by which a path 500 is inscribed along the ribbon and deflected laterally towards the right or left with regard to the direction of movement of the ribbon, accordingly as the speed of the car is reduced or accelerated. The path 500 indicates graphically along the short length of the ribbon shown in Figure 10, a speed varying from ten miles to fifty five miles per hour. In the path are indicated two points 501 and 502 where the car was stopped. At the first stop, 501, the car remained stationary during the time the minute recording roller 177 inscribed dots in a straight line across three of the longitudinal spaces divided off by the lines 901. As the relative width of each of these spaces is coordinated with the rotation of the time rollers, each space is of a width to represent five minutes of time. The minute indicating dots inscribed in a straight transverse line across three of these spaces, as at 503 prove, graphically presented, that the car waited at this point for fifteen minutes. Simultaneously the hour inscribing dashes show a distance of one-eighth of a space between the points where it ended and started again, see 504. At the second stop 502 the minute and hour inscribing dots prove that the car waited fourteen hours and fifteen minutes because the minute dots traverse the full width of the ribbon from margin to margin and an additional amount of three five-minute spaces, while the hour dots have traversed exactly seven two-hour spaces from six thirty o'clock to twenty-thirty o'clock. This proves that the car stopped first for fifteen minutes and a second time for fourteen hours and fifteen minutes. The starting of the car causes the dots to continue from the point where the record was stopped plus the time the car waited, and progresses as the car moves on its way, its starting point being spaced across the ribbon a distance commensurate with the time the car has waited. The record proves, graphically presented, that the car stopped twice during this mile of travel from 194 to 195 miles distant from its starting point. At the same time the path of the stylus proves that the car developed a speed of fifty-seven miles per hour before the first stop which was gradual; and sixty miles per hour just before the second stop which was very sudden. The first stop being for fifteen minutes might reasonably be accounted for, but the second stop might indicate an accident because the stop was for fourteen hours and fifteen minutes. The hour indicating dots 553 have recorded the hours the car has waited. As the car has actually waited fifteen hours and fifteen minutes, this is graphically indicated by the hour and minute inscribing dots. Proof of this is presented by the ribbon and the time recording dots. The hour recording roller rotates once in twenty-four hours, and the minutes recording roller, once each hour. The record is graphically inscribed on the ribbon and the precise movements of the car may be ascertained at a glance. This is an important feature of this invention, because it avoids the necessity of computing the record by means of a separate scale and my record does not require reliance on the human element. This is an important feature. Each time the car stops the recording stylus returns to zero; furthermore the stylus moves back and forth across the ribbon as the speed of the car varies. In order to depict at a glance the actual control of a car or bus by a chauffeur division lines printed on the ribbon should divide the width and length of the ribbon in aliquot parts, and they must be spaced proportionately to the feeding of ribbon, and the speed of rotation of the time rollers and the varying transverse motion of the stylus. This may be readily effected when the action of one of the elements of this combination of motions, or the divisions of the printed surface of the ribbon is known. The ribbon a portion of which is illustrated in Figure 9 is, as before mentioned, divided by transverse lines into longitudinal consecutive panels several of which are numbered in the illustration 194, 195 and 196. In Figure 10 a full mile panel is shown double normal size. The section of panel shown is a part of a two hundred mile record. The full length of the ribbon is divided into mile panel sections numbered consecutively from one to two hundred, and each panel, and consequently the entire two hundred mile length, is divided as described by parallel transverse lines into transverse spaces each representing thirty-five and one-fifth yards, and each panel will then represent one mile. The speed of rotation of the timing rolls, rate of movement of the ribbon and movement of the stylus may then be readily synchronized. The operations of the several instrumentalities are thus coordinated and an accurate record is graphically inscribed on the ribbon. When the car completes its trip and returns to its station assuming it is tramway's or other company's bus, the inspector may ascertain from the record exactly what the chauffeur has done with the bus. And the same applied to a taxicab or in fact the record may be applied to any operating machine.

What I claim is as follows:

1. In a time and distance recorder for a motor car, having a governor, and a record sheet operated by distance measuring means, a lever forked at one end and straddling and pivoted to a ring reciprocated by the governor, a guiding sleeve slidably carrying a rod with a stylus at one end in inscribing relation with the record sheet, for the purpose set forth.

2. In a recorder of the type described having a record roll operated by distance measuring means of a motor car, time controlled rollers having spirally arranged protruding pins, means whereby the pins of the clock-operated rollers inscribe time indications on said paper of a different character when the paper is being advanced from that made when the paper is stationary.

3. In a recorder of the type described having a record roll operated by distance measuring means of a motor car, time controlled rollers having spirally arranged protruding pins, means whereby the pins of the clock-operated rollers inscribe time indications on said paper made in the form of a line when the paper is being advanced and in the form of dots when the paper is stationary.

In testimony whereof I have signed my name to this specification.

JAMES RUSSELL McKENZIE TISDALE.